(12) United States Patent
Tajika et al.

(10) Patent No.: US 6,469,453 B2
(45) Date of Patent: Oct. 22, 2002

(54) BACKLIGHT FOR LIQUID CRYSTAL DISPLAY

(75) Inventors: Takahisa Tajika; Masashi Takamatsu; Noriaki Urakawa; Takuji Sasahara; Haruyasu Nishiyama, all of Hyogo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/795,422

(22) Filed: Feb. 28, 2001

(65) Prior Publication Data

US 2002/0047556 A1 Apr. 25, 2002

(30) Foreign Application Priority Data

Sep. 28, 2000 (JP) ........................................ 2000-296223

(51) Int. Cl.⁷ ............................................... H05B 37/00
(52) U.S. Cl. ........................ 315/199; 315/197; 315/198
(58) Field of Search ................................. 315/194, 195, 315/196, 197, 198, 199

(56) References Cited

U.S. PATENT DOCUMENTS

| | | | | |
|---|---|---|---|---|
| 4,441,055 A | * | 4/1984 | Balchjunas et al. | 315/288 |
| 4,772,022 A | | 9/1988 | Yoshitomi | 273/143 |
| 5,150,018 A | * | 9/1992 | Bruning et al. | 315/349 |

FOREIGN PATENT DOCUMENTS

JP  61-285429  12/1986

* cited by examiner

*Primary Examiner*—David Vu
(74) *Attorney, Agent, or Firm*—Greer, Burns & Crain, Ltd.

(57) ABSTRACT

A backlight used for a liquid crystal display includes a plurality of light emitting units, and a phase controller for adjusting the phase of the light emitting units. The light emitting units are turned on and off based on pulse signals of a predetermined cycle having an on-period and an off-period. Under the control of the phase controller, the light emitting units are turned on or off with different phases.

4 Claims, 5 Drawing Sheets

BACKLIGHT FOR LIQUID CRYSTAL DISPLAY

BACKGROUND OF THE INVENTION

1. Field of the Invention

The present invention relates to a backlight used for a liquid crystal display.

2. Description of the Related Art

As is known, liquid crystal displays (LCDs) may be provided with a backlight for making the displayed information discernible. A backlight may include two fluorescent lamps, inverters, etc. One of the lamps may be arranged along the upper edge of the LCD panel, while the other lamp along the lower edge of the panel. Based on predetermined pulse signals, the inverters supply driving voltage to the lamps. To be precise, this voltage supply is performed only in response to the on-periods of the pulse signals. As a result, the two lamps are simultaneously turned on and off (the so-called "chopping control"). The adjustment of brightness of the LCD panel is performed by changing the ratio of the length of the on-period to the length of one cycle of the pulse signal (one cycle consists of one on-period and one off-period). When the ratio is 90% for example, the brightness of the monitor may be the maximum. As the ratio decreases, the monitor brightness also decreases accordingly. Then, when the ratio is 50% for example, the monitor brightness may be the minimum.

The conventional LCD has been found disadvantageous in the following respect.

In the chopping control, as stated above, the two lamps are turned on and off simultaneously (i.e. in the same phase). In this manner, unfavorably, the monitor of LCD may start flickering when the above-mentioned ratio becomes smaller than 50%. This means that the dynamic range of the monitor brightness cannot be sufficiently wide.

SUMMARY OF THE INVENTION

The present invention has been proposed under the circumstances described above, and its main object is to provide an LCD backlight capable of providing an LCD with a wider dynamic range of the monitor brightness without compromising the information-presenting quality.

According to the present invention, there is provided a backlight for a liquid crystal display, which includes: N light emitting units to be turned on and off based on pulse signals of a predetermined cycle including an on-period and an off-period, where N is an integer equal to or greater than 2; and a phase controller for controlling a phase of each of the pulse signals. The on-periods of the respective pulse signals are phase shifted to each other.

Preferably, the on-periods of the respective pulse signals may be phase shifted by 360°/N.

The backlight of the present invention may further include a rectangular light guide provided with a pair of parallel edges along which the light emitting units are arranged.

Preferably, each of the light emitting units may be provided with a cold cathode tube.

Preferably, the light emitting units may be operated in at least three modes including a high brightness mode, a standard brightness mode and a low brightness mode. In the lower brightness mode, the on-periods of the respective pulse signals do not overlap each other.

Other features and advantages of the present invention will become apparent from the detailed description given below with reference to the accompanying drawings.

DETAILED DESCRIPTION OF THE PREFERRED EMBODIMENTS

The preferred embodiments of the present invention will be described below with reference to the accompanying drawings.

Figure 1:
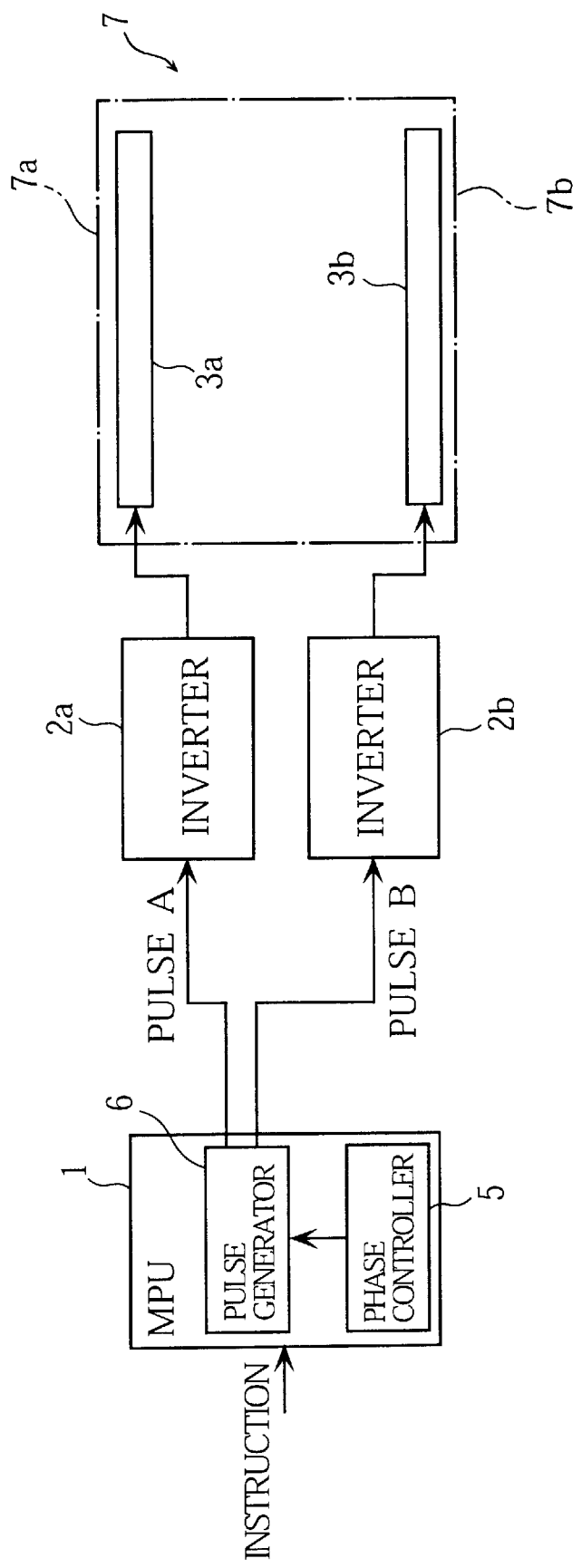
FIG. 1 is a block diagram showing the principal components of a backlight embodying the present invention.

FIG. 1 schematically shows the principal components of a backlight embodying the present invention. The illustrated backlight, used as a light source of a liquid crystal display (LCD), includes a main controller 1, first and second inverters 2a–2b, and first and second fluorescent lamps 3a–3b.

The main controller 1 includes MPU (microprocessor unit) for controlling the LCD as a whole. In particular, the MPU serves as phase controller 5 and pulse generator 6. The phase controller 5 controls the on-off timing of the first and the second lamps 3a, 3b. The pulse generator 6 supplies a pulse signal A to the first inverter 2a, and a pulse signal B to the second inverter 2b. These pulse signals are subjected to pulse width modulation (PWM) before being sent to the inverters 2a, 2b.

Based on the pulse signal A, the first inverter 2a supplies an alternating voltage to the first lamp 3a, thereby turning the lamp 3a on and off periodically. Similarly, the second inverter 2b supplies an alternating voltage to the second lamp 3b in accordance with the pulse signal B, to turn the lamp 3b on and off periodically.

The two lamps 3a, 3b are provided at the back of an LCD panel 7. The illustrated panel 7 is rectangular and has relatively long upper and lower edges 7a, 7b. The first lamp 3a is disposed close to the upper edge 7a, while the second lamp 3b is disposed close to the lower edge 7b.

Figure 2:
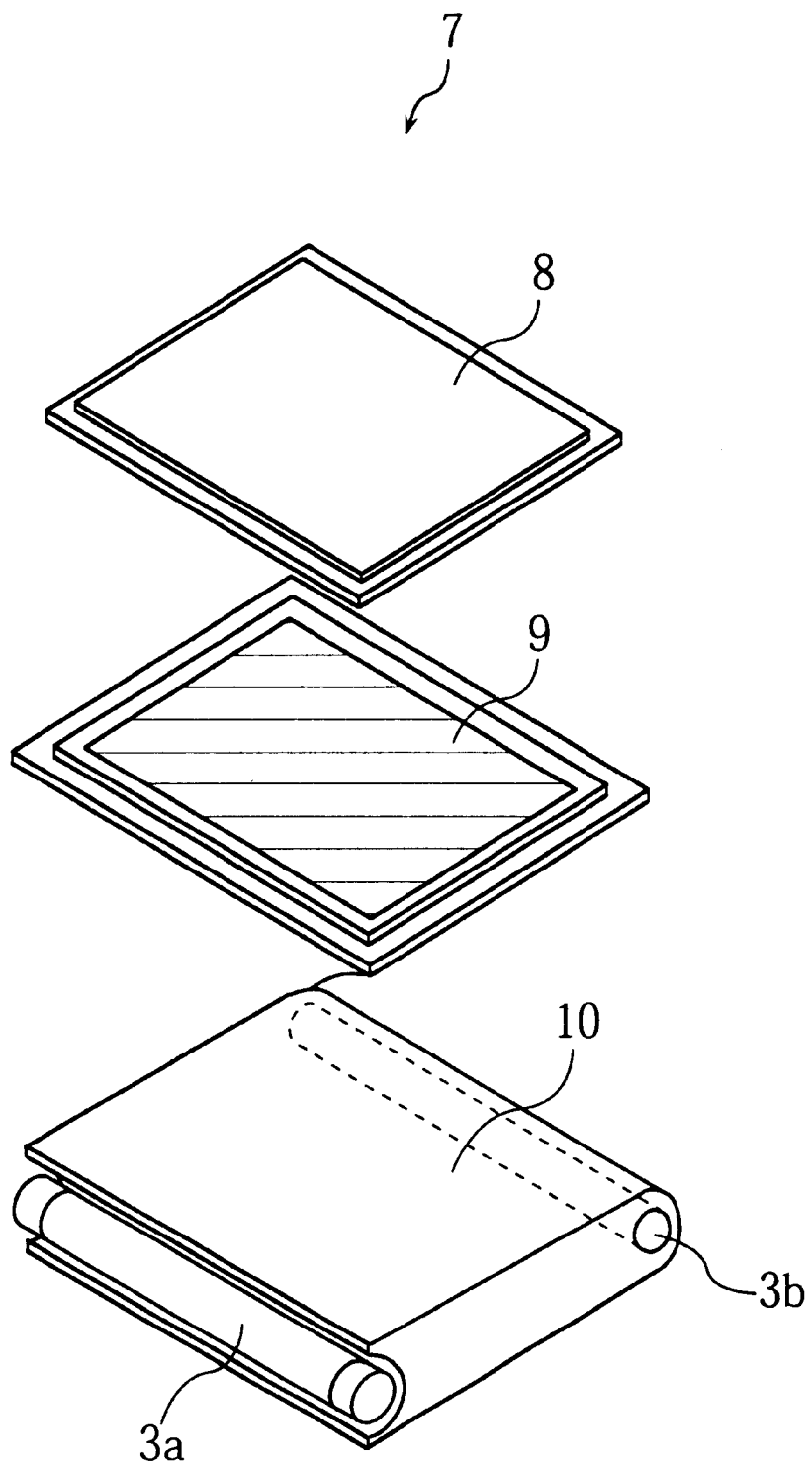
FIG. 2 is an exploded view showing an LCD panel.

Referring to FIG. 2, the LCD panel 7 includes a protection plate 8, a liquid crystal unit 9, and a light guide 10. The protection plate 8, made of a transparent glass or resin material, protects the LC unit 9 from damage. The LC unit 9 is a conventional one which consists of liquid crystal, color filters, glass substrates (upon which transparent electrodes and transistors are provided), polarizers, etc. The light guide 10 distributes the light emitted from the lamps 3a, 3b over the entire surface of the LC unit 9. Each of the first and the second lamps 3a, 3b extends along one of the two longer edges of the light guide 10.

Figure 3:
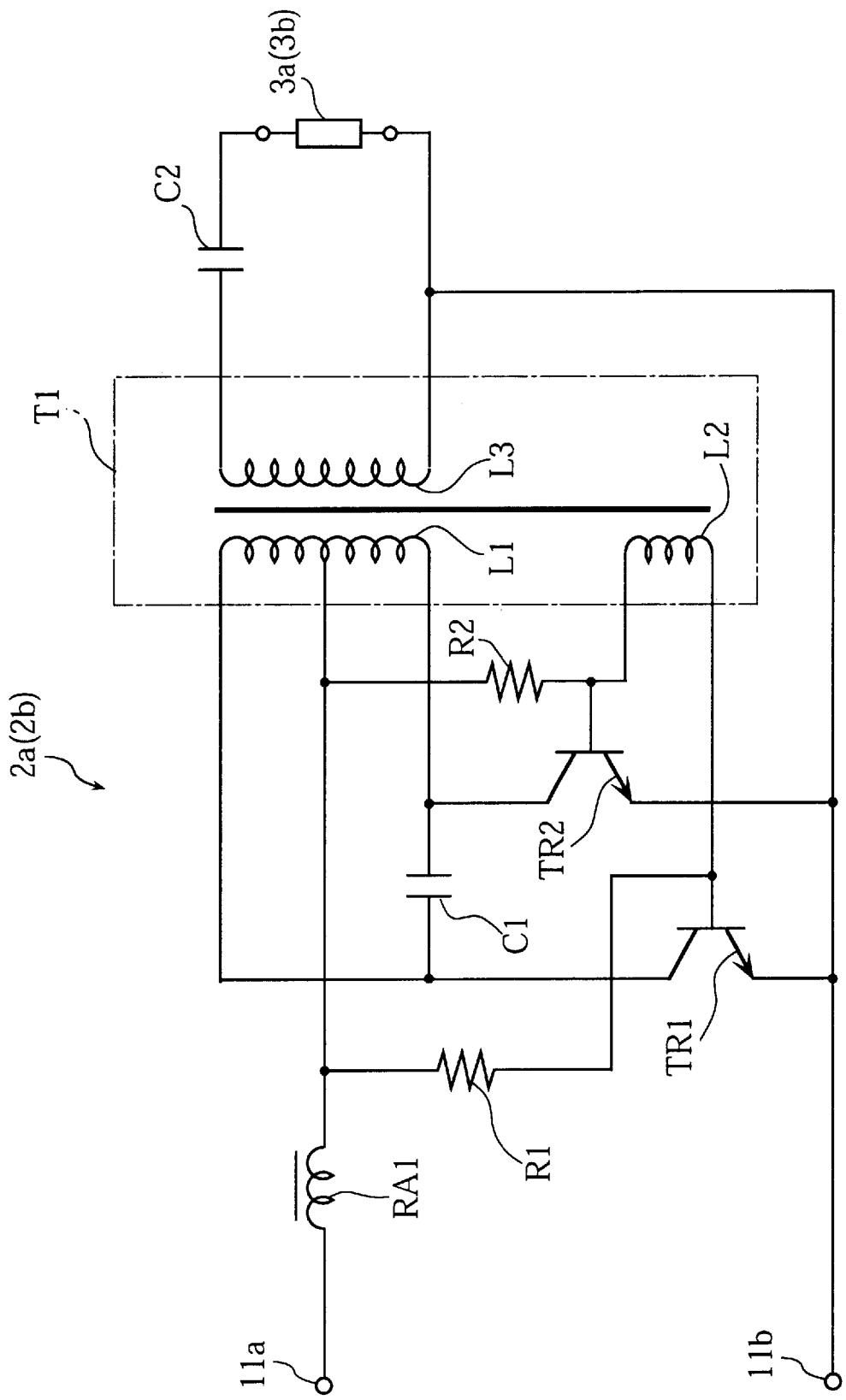
FIG. 3 is a circuit diagram of the inverter shown in FIG. 1.

Referring to FIG. 3, the first inverter 2a includes two input terminals 11a–11b, two transistors TR1–TR2, a high-voltage transformer T1, a direct-current reactor RA1, two capacitors C1–C2, and two resistors R1–R2. The transformer T1 is provided with three windings L1–L3. The second inverter 2b is identical with the first inverter 2a.

The function of the backlight will now be described. First, as shown in FIG. 1, an instruction signal is supplied to the main controller 1 for adjusting the brightness of the monitor. This instruction signal may be issued as a result of the user's operation of brightness adjustment. Alternatively, the instruction signal may be issued automatically in response to a detection signal from an optical sensor provided for checking the brightness of the neighborhood of the LCD.

Figure 4A:
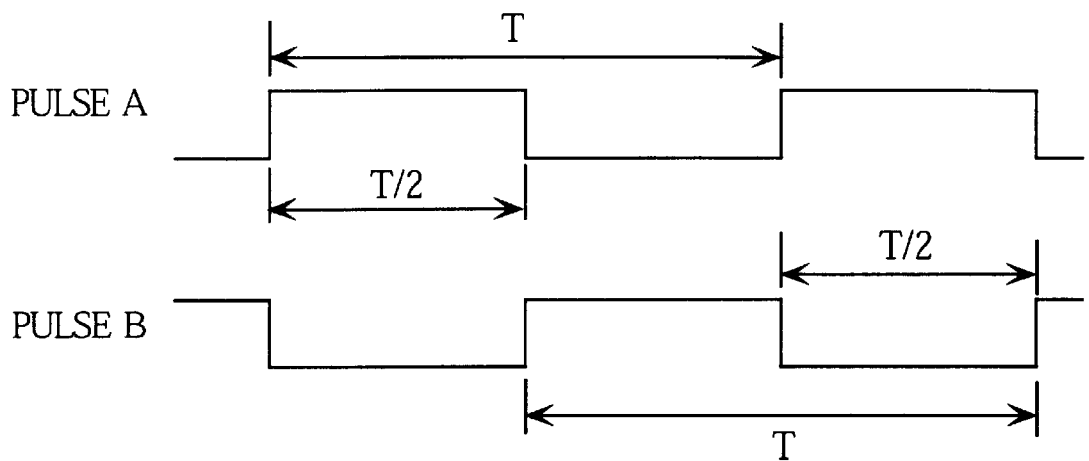
FIGS. 4A–4C show examples of pulse signals for controlling the operation of the backlight.
Figure 4B:
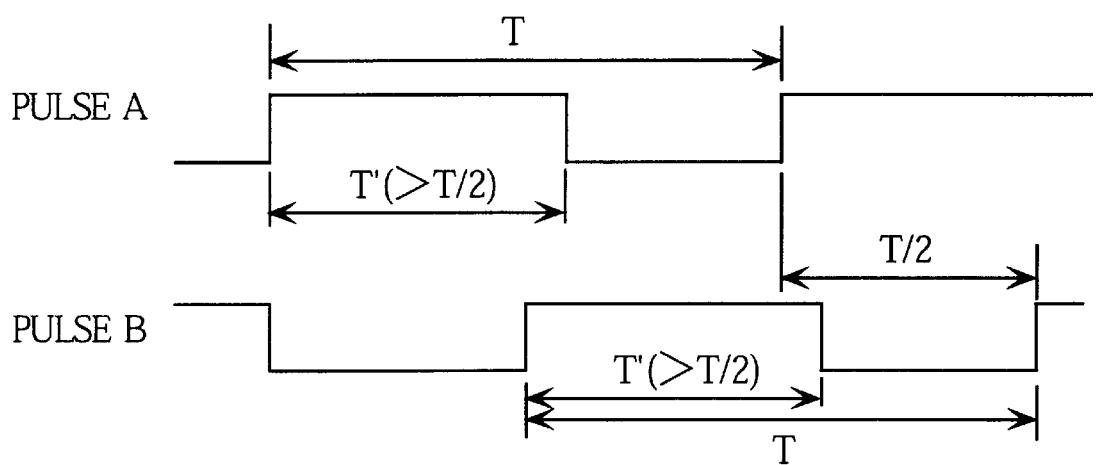
Figure 4C:
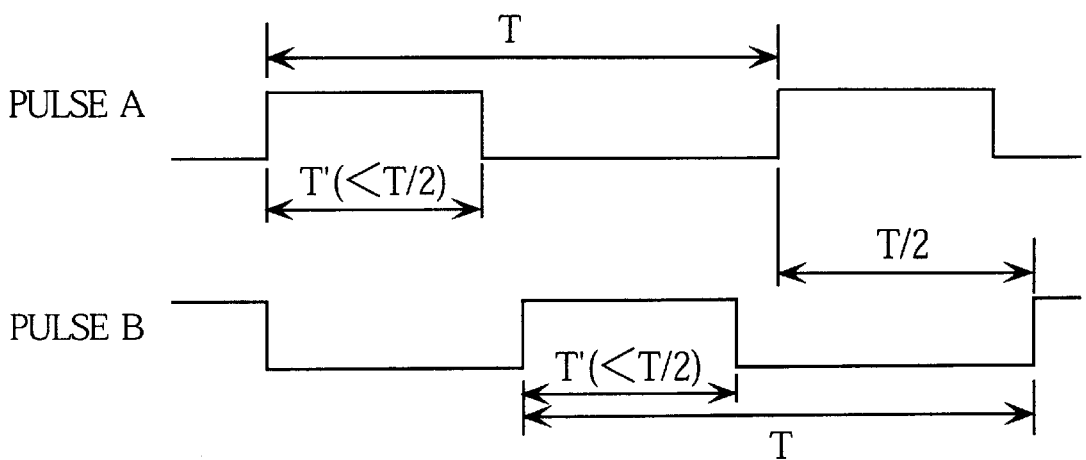

Based on the supplied instruction signal, the main controller 1 adjusts the duty factor of the pulse signals A and B. Here, the duty factor is the ratio of the on-duty period to the off-duty period in one cycle of the pulse signal. Specifically, referring to FIGS. 4A–4C, the pulse signals A and B have a predetermined cycle T and are phase shifted relative to each other by 180°. The cycle T may be 1/200 seconds. In the standard brightness mode shown in FIG. 4A, the duty factor of each of the pulse signals A and B is 50%. Upon receiving an instruction signal to increase the brightness of the monitor, the main controller 1 makes the duty factor of each pulse signal greater than 50%, whereby the on-duty period T' is longer than T/2, as shown in FIG. 4B (high brightness mode). Conversely, upon receiving an instruction signal to reduce the brightness of the monitor, the main controller 1 makes the duty factor smaller than 50%, whereby the on-duty period T' is shorter than T/2, as shown in FIG. 4C (low brightness mode).

When the pulse signal A (or B) is supplied from the main controller 1 to the input terminals 11a, 11b of the first inverter 1a (or second inverter 1b), the transistors TR1 and TR2 are brought into an active state by the currents passing through the resistor R1 or R2 during the on-duty period of the pulse signal. Since the winding L2 of the transformer T1 serves as a part of the positive feedback circuit, the two transistors TR1 and TR2 are activated in turn. For instance, while the transistor TR1 is turned on, the other transistor TR is turned off. This on-off state is maintained for half the oscillation cycle of the inverter 2a (or 2b). During the latter half of the cycle, the transistor TR1 is turned off, whereas the transistor TR2 is turned on. This alternate activation of the two transistors is repeated, which results in generation of a sinusoidal voltage. This voltage is applied to the winding L1 of the transformer T1, whereby a much higher sinusoidal voltage is generated across the output terminals of the winding L3 connected to the lamp 3a (or 3b). The frequency of the sinusoidal voltage is 50 kHz for example, which is determined by the LC resonance circuit consisting of the transformer T1 and the capacitors C1–C2.

In the standard brightness mode, the duty factor of the pulse signals A, B is 50%. Thus, as shown in FIG. 4A, the turning-on and the turning-off of the first lamp 3a coincide with the turning-off and the turning-on of the second lamp 3b. In the high brightness mode, as shown in FIG. 4B, the second lamp 3b is turn on while the first lamp 3a is still in the on-state, and turned off after the first lamp 3a has been turned off. In the low brightness mode, as shown in FIG. 4C, the actuation period (on-light period) of the first lamp 3a does not overlap that of the second lamp 3b. In any mode, the first and the second lamps 3a, 3b are not simultaneously turned on or off. Thus, the peak current of the power circuit remains small, and the occurrence of noise is reliably prevented.

According to the present invention, the duty factor of each of the pulse signals A, B can be varied in a range of 35–90% without compromising the information-presenting quality of the monitor, while the conventional duty factor can be varied only in a range of 50–90%. The 35% minimum duty factor of the present invention is advantageous in the following respect, as compared to the conventional minimum duty factor (50%).

In the conventional chopping control, the first and the second lamps are simultaneously turned on and off, as previously stated. Thus, when the duty factor of the pulse signals is set to the minimum value 50% to obtain the lowest monitor brightness, the off-light period (during which the two lamps are both turned off) is 50% of one cycle of the pulse signal. According to the present invention, on the other hand, the duty factor is set to 35% to obtain the lowest monitor brightness. In this instance, as seen from FIG. 4C, the sum of the on-duty period T' (=35%) of the signal A and the on-duty period T' (=35%) of the signal B is 70% of one complete cycle T (=100%). Consequently the remaining part (i.e., the off-light period) is 30% of the cycle T, which is shorter than the conventional counterpart (50%). This means that the dynamic range of the monitor brightness can be made greater than is conventionally possible.

Though the lamps 3a, 3b are arranged along the longer edges of the LCD panel 7 in the illustrated embodiment, they maybe disposed along the shorter edges of the panel 7. Also, each of the lamps 3a, 3b may be replaced by more than one light emitting device. Further, the fluorescent lamps 3a, 3b may be replaced by cold cathode tubes or other illuminating devices.

In the illustrated embodiment, two light emitting units are provided in the backlight. However, three or more light emitting units may be used. When "N" light emitting units (N≧2) are used, the actuation phases of these light emitting units may be shifted by 360°/N.

Figure 5A:
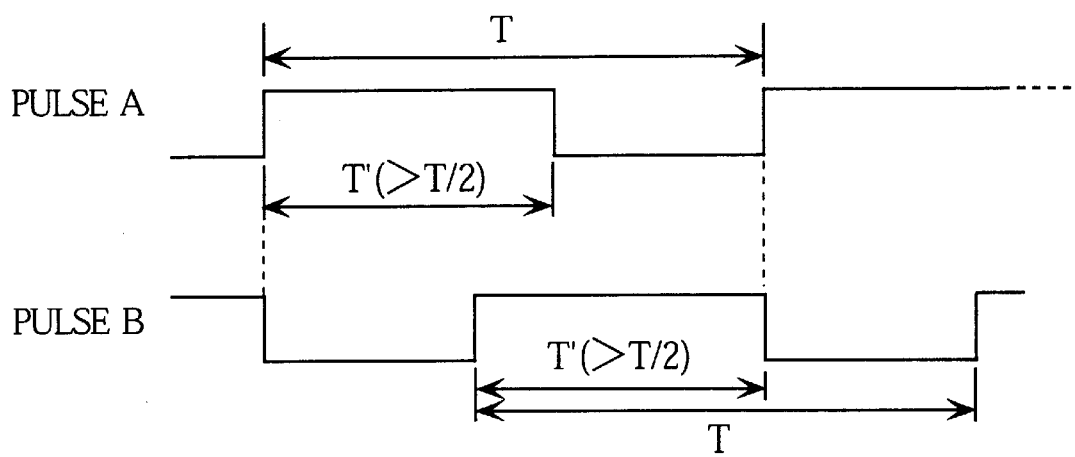
FIGS. 5A–5B show different examples of pulse signals for controlling the operation of the backlight.
Figure 5B:
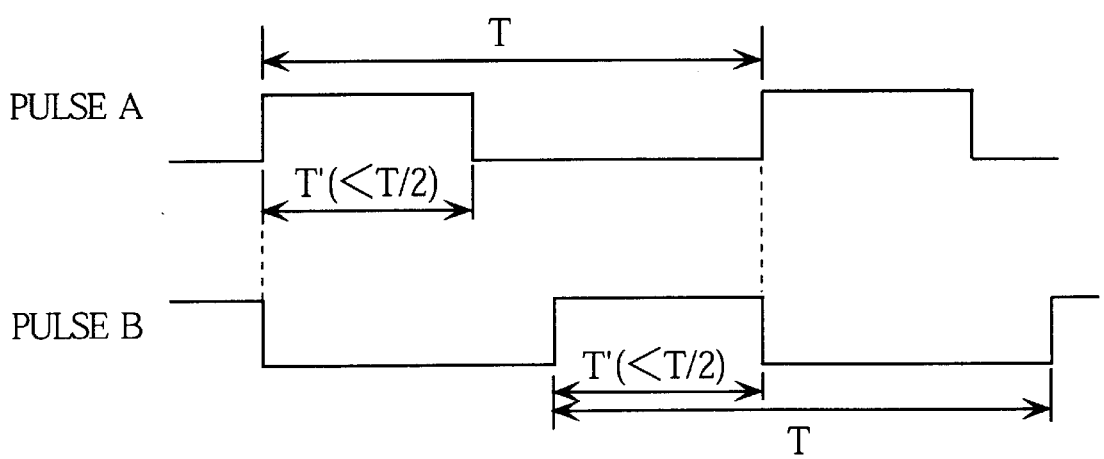

In the examples shown in FIGS. 4A–4C, the leading edge (transition from low to high) in one cycle of the pulse signal A is phase shifted by 180° relative to the leading edge in a corresponding one of the cycles of the pulse signal B. The present invention, however, is not limited to this. For instance, in a high brightness mode, the phase difference between the leading edge of the signal A and the corresponding leading edge of the signal B may be smaller than 180°, as shown in FIG. 5A, or greater than 180°, as shown in FIG. 5B. In either case, the leading edge of the signal A coincides with the trailing edge (transition from high to low) of the signal B.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A backlight for a liquid crystal display comprising:
    a plurality of light emitting units to be turned on and off based on pulse signals of a predetermined cycle including an on-period and an off-period; and
    a phase controller for controlling a phase of each of the pulse signals;
    wherein the on-periods of the respective pulse signals are phase shifted to each other, and the light emitting units are operated in at least three modes including a high brightness mode, a standard brightness mode and a low brightness mode, the on-period of the respective pulse signals overlapping each other in the high brightness mode, the on-period of the pulse signal for each light emitting unit coinciding with the off-period of the pulse signal for another light emitting unit in the standard brightness mode, the on-periods of the respective pulse signals being prevented from overlapping each other in the low brightness mode.

2. The backlight according to claim 1, wherein the on-periods of the respective pulse signals are phase shifted by 360°/N, where N is a number of the light emitting units.

3. The backlight according to claim 1, further comprising a rectangular light guide provided with a pair of parallel edges along which the emitting units are arranged.

4. The backlight according to claim 1, wherein each of the light emitting units comprises a cold cathode tube.

* * * * *